A. SEARLS.

WHIP SOCKET.

No. 9,872. Reissued Sept. 13, 1881.

*Witnesses:*

Henry Eichling

M. F. Clifton

*Inventor.*

Anson Searls per J. P. Ticlet his Atty.

N. PETERS, Photo-Lithographer, Washington, D. C.

UNITED STATES PATENT OFFICE.

ANSON SEARLS, OF NEWARK, NEW JERSEY.

WHIP-SOCKET.

SPECIFICATION forming part of Reissued Letters Patent No. 9,872, dated September 13, 1881.

Original No. 139,026, dated May 20, 1873. Application for reissue filed March 2, 1880.

*To all whom it may concern:*

Be it known that I, ANSON SEARLS, of Newark, New Jersey, have invented certain new and useful Improvements in Whip Sockets and Fasteners, which are simple in construction, efficient in operation, and durable in use; and it consists in the construction of a straight tubular socket, which will hold the whip erect, without regard to the ordinary size of the whip, by a clamping pressure, and in the construction of a fastener, as hereinafter more fully described, and pointed out by the claims; and I do hereby declare that the following is a full, clear, and exact description of the invention, which will enable others skilled in the art to which it appertains to make and use the same, reference being had to the accompanying drawings, with letters of reference marked thereon, forming a part of this specification, in which—

Figure 1:
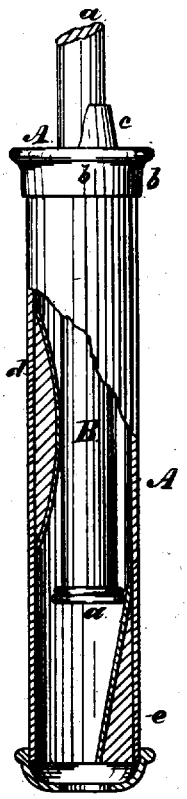
Figure 2:
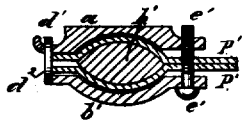

Figure 1 represents a whip-socket embodying my invention, with a portion broken away, showing the interior; and Fig. 2 is a longitudinal section of the fastener.

A represents a straight tubular socket, and *b* a ring at the top end to strengthen and finish the end.

C is a projection on one side of the interior of the upper end, preferably concave on the inner face, and projecting a little above the end of the socket, as shown in the drawings. *d* is another projection or raised portion on the interior of the socket intermediate the ends, and on the side opposite to C; and *e* is a third projection on the interior of the socket, at the lower end, and opposite to *d*. *e* has preferably an inclined face, as shown in the drawings, inclining inward toward the center of the socket.

By this construction the butt *a* of a whip, B, is inserted in the top of the socket on one side of the projection C, sliding down past the projection *d*, which throws the whip to the opposite side of the socket, so that it impinges against the projection *e*, by which means it is held firmly in place, and the socket, by this construction, accommodates itself to any ordinary size of whip.

The fastener consists of the jaws $a'$ and $b'$, adapted to clamp between them a dash-rail. One of the jaws is attached to the socket by means of a screw, or by any other convenient or desired mode of fastening, and the other connected to said rigidly-connected jaw by means of a hinge-joint at one end and a screw at the other end. The hinge-joint may be formed by making an opening in the end $b^2$ of one of the jaws, with a hook or loop, $d'$, on the end of the other jaw, which passes through and is hooked or looped into said opening. $e'$ is a screw that passes through and binds together the opposite ends of the said jaws. $h'$ represents a cross-section of an ordinary carriage-dash rail; $p'$ $p^2$, the leather of such dash. It is preferable to construct the hinge described so that the said jaws may be readily detached from each other. This may be effected by not entirely closing the loop or hook $d'$.

Having thus fully described my invention, what I claim, and desire to secure by Letters Patent, is—

1. The straight tubular socket A, provided with the projections C and *d* and incline *e*, constructed and arranged substantially as and for the purpose herein set forth.

2. The combination, with a whip-socket, of a fastener designed and adapted to attach the socket to a vehicle, consisting of two jaws, one of which is stationary by being made fast to the socket, and the other hinged to the said stationary jaw at one end and clamped to it by a screw at the opposite end, substantially as and for the purpose described.

ANSON SEARLS.

Witnesses:

A. S. FITCH,

M. F. CLIFTON.